United States Patent
Mair

(10) Patent No.: US 8,246,516 B2
(45) Date of Patent: Aug. 21, 2012

(54) METHOD FOR OPERATING A DRIVE TRAIN

(75) Inventor: Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 465 days.

(21) Appl. No.: 12/596,250

(22) PCT Filed: Apr. 3, 2008

(86) PCT No.: PCT/EP2008/053973
§ 371 (c)(1),
(2), (4) Date: Oct. 16, 2009

(87) PCT Pub. No.: WO2008/132012
PCT Pub. Date: Nov. 6, 2008

(65) Prior Publication Data
US 2010/0113220 A1    May 6, 2010

(30) Foreign Application Priority Data
Apr. 26, 2007 (DE) .......................... 10 2007 019 657

(51) Int. Cl.
*F16H 59/48* (2006.01)
*B60W 10/04* (2006.01)
(52) U.S. Cl. ........................ 477/120; 477/203
(58) Field of Classification Search .................... 477/73, 477/77, 120, 136, 203
See application file for complete search history.

(56) References Cited

U.S. PATENT DOCUMENTS

| | | | |
|---|---|---|---|
| 4,874,070 A | 10/1989 | Nellums et al. | |
| 5,466,199 A | 11/1995 | Kobayashi et al. | |
| 5,491,635 A | 2/1996 | Foeldi et al. | |
| 6,558,294 B1 * | 5/2003 | Stafner | 477/120 |
| 2003/0070656 A1 * | 4/2003 | Kammerer et al. | 123/396 |
| 2005/0096181 A1 | 5/2005 | DeVore et al. | |

FOREIGN PATENT DOCUMENTS

| | | |
|---|---|---|
| DE | 100 40 167 A1 | 3/2001 |
| DE | 102 08 205 A1 | 9/2002 |
| DE | 102 02 520 A1 | 8/2003 |
| DE | 103 56 194 A1 | 7/2005 |
| DE | 10 2005 032 614 A1 | 1/2007 |
| DE | 10 2005 035 303 A1 | 2/2007 |
| GB | 2 353 835 B | 3/2001 |

* cited by examiner

*Primary Examiner* — Edwin A Young
(74) *Attorney, Agent, or Firm* — Davis & Bujold, P.L.L.C.

(57) ABSTRACT

A method of operating a drive train of a motor vehicle that has at least an automatic transmission and a drive unit. A starting rotational speed is determined for starting the motor vehicle, and a starting process is initiated with the determined starting rotational speed by engaging a starting element, in particular a starting clutch. The starting rotational speed may be individually set by a driver in such a way that, when the automatic transmission is in the neutral position, the engine speed of the drive unit may be determined by the driver by actuating the accelerator pedal, and that once the automatic transmission is shifted from the neutral position to a either a forward gear or a reverse gear, the engine speed of the drive unit, prevailing during the shift of the automatic transmission, is used as the starting rotational speed.

11 Claims, 1 Drawing Sheet

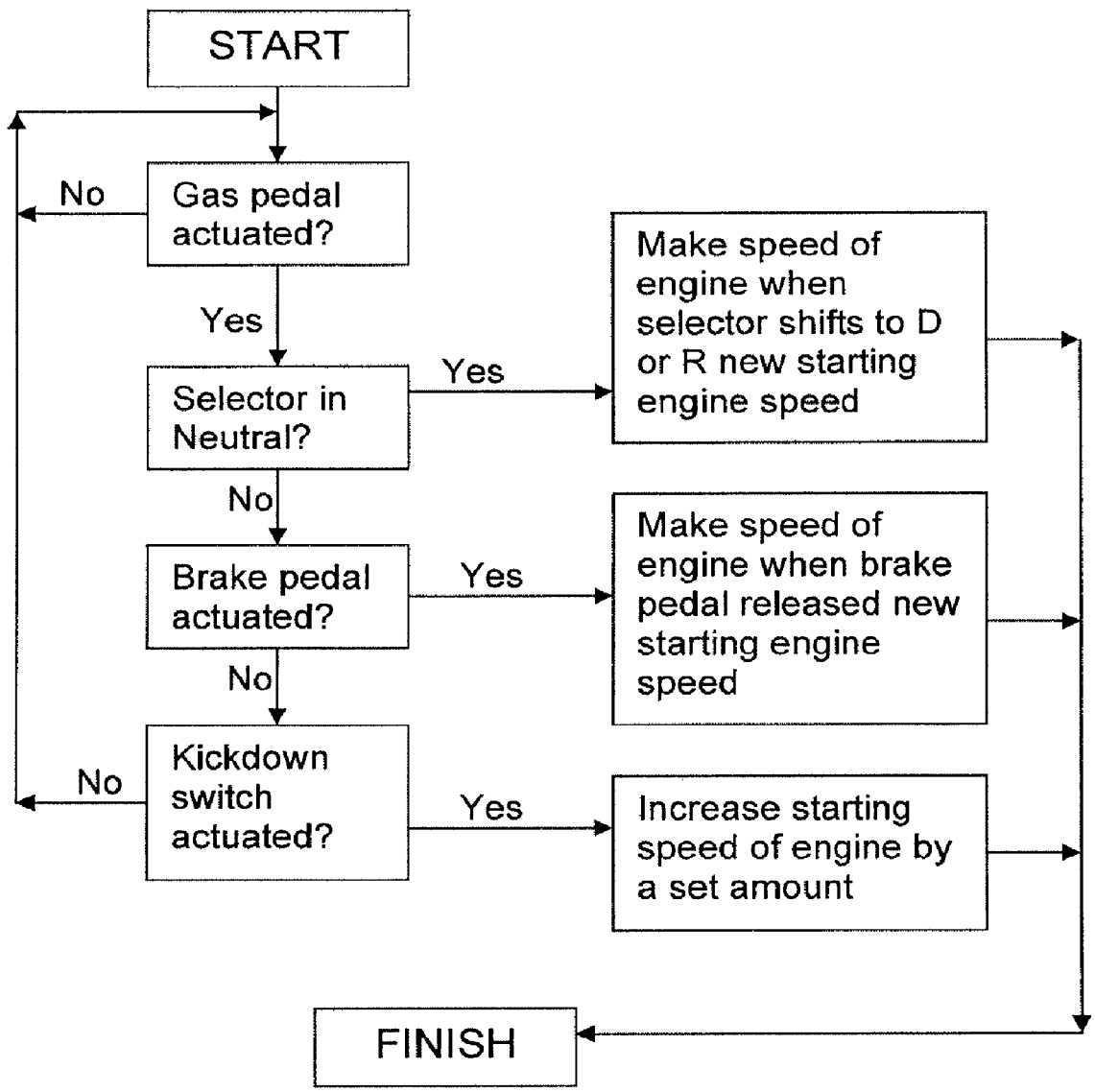

METHOD FOR OPERATING A DRIVE TRAIN

This application is a National Stage completion of PCT/EP2008/053973 filed Apr. 3, 2008, which claims priority from German patent application serial no. 10 2007 019 657.3 filed Apr. 26, 2007.

FIELD OF THE INVENTION

The present invention relates to a method for operating a drive train of a motor vehicle, at least comprising an automatic transmission and a drive unit.

BACKGROUND OF THE INVENTION

The main components of a drive train of a motor vehicle are a drive unit and a transmission. A transmission converts torque and rotational speeds and thus implements the traction force available in the drive unit. The present invention relates to a method for operating a drive train, which has at least one drive unit and an automatic transmission. In the context of the present invention, the term automatic transmission should be understood to be any transmission with automated gear change or automatic gear change.

A method is known from DE 102 02 520 A1, by means of which a starting rotational speed may be determined for a starting process, namely in such a way that a target starting rotational speed specified by characteristic curves during the starting process is modified on the basis of a parameter that reflects the actual acceleration of the motor vehicle.

There are situations in which starting the motor vehicle with a starting rotational speed that is determined with the methods known from prior art cannot be ensured, and therefore may result in the motor vehicle staying halted. This is, for example, a situation in which a motor vehicle has to overcome an undetectable obstacle, such as a curbstone. In such a situation, reliably starting the motor vehicle with the methods known from prior art cannot be ensured.

Although the driver of the motor vehicle recognizes the need for increasing the starting rotational speed, the driver has no influence on it. With the methods known from prior art, there is no possibility for the driver to influence the increase of the starting rotational speed individually.

BRIEF DESCRIPTION OF THE DRAWING

The sole FIGURE diagrammatically shows the various steps for accomplishing the presently claimed method of operating a drive train.

DETAILED DESCRIPTION OF THE PREFERRED EMBODIMENTS

On this basis, the object of the present invention is to provide a novel method for operating a drive train of a motor vehicle, comprising at least one automatic transmission and a drive unit.

Turning now to the sole Figure, three aspects of the present invention are diagrammatically shown therein. According to a first aspect of the present invention, this object is achieved. Based on this method, the starting rotational speed may be individually adjusted by the driver in such a way that, when the automatic transmission is in the neutral position, the engine rotational speed of the drive unit may be allocated by the driver by actuating the accelerator pedal, and that once the automatic transmission is transferred from neutral to a position corresponding to a forward gear or reverse gear, the engine speed of the drive unit prevailing during the transfer is used as the starting rotational speed.

According to a second aspect of the present invention, this object is achieved. Accordingly, the starting rotational speed may be individually adjusted by the driver in such a way that, when the automatic transmission is in the position corresponding to a forward gear or reverse gear, the engine speed of the drive unit may be allocated by the driver by actuating the accelerator pedal while the brake pedal is simultaneously actuated, and that once the brake pedal is released, the engine speed of the drive unit prevailing during the release is used as the starting rotational speed.

According to a third aspect of the present invention, this object is achieved. Based on this method, the starting rotational speed is increased when a kickdown switch is actuated by the driver actuating the accelerator pedal.

The claimed methods according to all three aspects of the present invention allow the driver to adjust, in fact increase, the starting rotational speed to still cause the motor vehicle to start when a starting rotational speed specified by the transmission control device and/or engine control device of the drive train is not sufficient for starting. With the method according to the first aspect and the second aspect of the invention, the starting rotational speed may be directly preselected by a driver by actuating the accelerator pedal. According to the third aspect of the present invention, the starting rotational speed is increased by actuating the kickdown switch.

Preferred refinements of the invention are apparent from the dependent claims and the following description. Exemplary embodiments of the invention are explained in more detail below, without limiting the invention to these.

The present invention relates to a method for operating a drive train of a motor vehicle, wherein such a drive train at least comprises a drive unit and an automatic transmission.

The present invention relates to starting a motor vehicle with such a drive train, namely when the starting rotational speed specified by a transmission control device or an engine control device is not sufficient for starting the motor vehicle. In this case, the invention allows the driver to designate the starting rotational speed himself, in fact individually increase it.

According to the first aspect of the present invention, the starting rotational speed may be individually adjusted and/or defined by a driver in such a way that when the automatic transmission is in the neutral position, the driver may adjust the engine speed of the drive unit by actuating the accelerator pedal. Once the automatic transmission is shifted from the neutral position to a position corresponding to a forward gear or reverse gear, the engine speed prevailing during the shift and/or the actual engine speed of the drive unit is used as the starting rotational speed.

In this case, the engine speed prevailing during the shift of the automatic transmission from the neutral position to the position corresponding to a forward gear or reverse gear is first stored, and this stored rotational speed is afterward used as the starting rotational speed for a subsequent starting process triggered by actuating the accelerator pedal. With the rotational speed preselected in this way by the driver, a starting process is then accordingly triggered only when the accelerator pedal is again actuated after it has completely dropped.

It may in this case be preferably provided that after the complete drop of the accelerator pedal, it has to be again actuated within a defined time span.

In order to avoid excessive strain on the starting element, in particular on the starting clutch, during the starting process, it may be provided that the engine speed prevailing during the shift of the automatic transmission from the neutral position to a position corresponding to a forward gear or reverse gear is limited by a maximum value.

The starting rotational speed individually determined and/or set by the driver in the above-described way may either be only valid for a single subsequent starting process or for a defined number of subsequent starting processes. It may further be provided that the starting rotational speed individually set by the driver in the above-described way is additionally or alternatively valid for a defined period.

It may, for example, be provided that the starting rotational speed individually determined and/or set by the driver in the above-described way is only used as the starting rotational speed when the smallest possible forward gear or the smallest possible reverse gear is selected in the position corresponding to a forward gear or reverse gear.

According to a second aspect of the present invention, the starting rotational speed may be individually set by a driver in such a way that, when the automatic transmission is in the position corresponding to a forward gear or reverse gear, the engine speed of the drive unit may be determined by the driver by actuating the accelerator while the brake pedal is simultaneously actuated, and that after releasing the brake pedal, the engine speed of the drive unit prevailing during the release of the brake pedal is used as the starting rotational speed.

In this context, it may be provided that the engine speed of the drive unit prevailing during the release of the brake pedal is used as the starting rotational speed in such way that a starting process is immediately triggered with the starting rotational speed once the brake pedal is released. Alternatively, it is possible that the engine speed of the drive unit prevailing during the release of the brake pedal is used as the starting rotational speed in such a way that a starting process is only triggered with the starting rotational speed once the accelerator pedal is again actuated after it has completely dropped.

The engine speed of the drive unit prevailing during the release of the brake pedal is preferably only used as the starting rotational speed when the smallest possible forward gear or the smallest possible reverse gear is selected in the position corresponding to a forward gear or reverse gear.

This takes into account the aspect that the starting ability of the motor vehicle may already be established by selecting a smaller forward gear and/or reverse gear without influencing the starting rotational speed. Only when the starting ability cannot be established in the smallest possible forward gear and/or reverse gear will the driver be allowed to individually increase the starting rotational speed. In this way, excessive strain on the starting element, namely the starting clutch, may be prevented.

The smallest possible forward gear and/or smallest possible reverse gear for which the driver is allowed to individually set and/or increase the starting rotational speed may be freely applied. It may further be provided that faults in the automatic transmission are taken into account. If, for example, the first forward gear cannot be shifted into, the driver would be enabled to individually increase the starting rotational speed to the second forward gear on the basis of the fault detected for the first forward gear, and thus establish the starting ability of the motor vehicle.

According to the second aspect of the present invention, it is also possible to use the engine speed of the drive unit prevailing during the release of the brake pedal as the starting rotational speed in such a way that this rotational speed is limited by a maximum value. In this way, excessive strain on the starting element, namely the starting clutch, may again be prevented.

The starting rotational speed individually selected in the above-described way by the driver may be only applicable to either a single subsequent starting process or to a defined number of subsequent starting processes. It may further be provided that the starting rotational speed individually set by the driver in the above-described way is additionally or alternatively valid for a defined period.

According to a third aspect of the present invention, it is proposed that the starting rotational speed may be influenced by the driver by actuating a kickdown switch. According to the third aspect of the present invention, if a kickdown switch is complete when the driver actuates the brake pedal during the starting process, the starting rotational speed specified by the transmission control device and/or engine control device is increased by a defined offset value. In this connection, the rotational speed increase is limited by completing the kickdown switch so as not to excessively increase the starting rotational speed with each kickdown initiation, and thus expose the starting element, namely the starting clutch, to heavy strain and increased high wear.

The invention claimed is:

1. A method of operating a drive train of a motor vehicle in which the drive train comprises at least an automatic transmission and a drive unit, with a starting rotational speed of the drive unit being determined for starting the motor vehicle, and a starting process being initiated with the determined starting rotational speed of the drive unit by engaging a starting element, the method comprising the steps of:
    individually setting the starting rotational speed by a driver such that when the automatic transmission is in a neutral position, an engine speed of the drive unit is determined by the driver by actuating an accelerator pedal;
    shifting the automatic transmission from the neutral position to either a forward gear or a reverse gear; and
    utilizing the engine speed of the drive unit, prevailing during the shift of the automatic transmission, as the starting rotational speed.

2. The method according to claim 1, further comprising the step of storing the starting rotational speed and utilizing the starting rotational speed during a subsequent starting process triggered by actuation of the accelerator pedal.

3. The method according to claim 2, further comprising the step of only triggering a starting process with the starting rotational speed when the accelerator pedal is again actuated after the starting rotational speed has completely dropped.

4. The method according to claim 1, further comprising the step of utilizing the engine speed, prevailing during the shift of the automatic transmission to either the forward gear or the reverse gear, as the starting rotational speed for at least one subsequent starting process.

5. The method according to claim 1, further comprising the step of utilizing the engine speed, prevailing during the shift of the automatic transmission to either the forward gear or the reverse gear, as the starting rotational speed and limiting the starting rotational speed by a maximum value.

6. The method according to claim 1, further comprising the step of only utilizing the engine speed, prevailing during the shift of the automatic transmission to either the forward gear or the reverse gear, as the starting rotational speed when shifting the automatic transmission to either a lowest possible forward gear or a lowest possible reverse gear.

7. A method of operating a drive train of a motor vehicle in which the drive train comprises at least an automatic transmission and a drive unit, with a starting rotational speed of the drive unit being determined for starting the motor vehicle, and a starting process being initiated with the determined starting rotational speed of the drive unit by engaging a starting element, the method comprising the steps of:
 individually setting the starting rotational speed by a driver such that when the automatic transmission is in either a forward gear or a reverse gear, an engine speed of the drive unit is determined by the driver by simultaneously actuating an accelerator pedal and a brake pedal;
 releasing the brake pedal; and
 utilizing the engine speed of the drive unit, prevailing during the release of the brake pedal, as the starting rotational speed.

8. The method according to claim 7, further comprising the step of utilizing the engine speed of the drive unit, prevailing during the release of the brake pedal, as the starting rotational speed such that the starting process is immediately initiated with the starting rotational speed once the brake pedal is released.

9. The method according to claim 7, further comprising the step of utilizing the engine speed of the drive unit, prevailing during the release of the brake pedal, as the starting rotational speed such that the starting process is only initiated with the starting rotational speed when the accelerator pedal is again actuated after the starting rotational speed has completely dropped.

10. The method according to claim 7, further comprising the step of utilizing the engine speed of the drive unit, prevailing during the release of the brake pedal, as the starting rotational speed and limiting the starting rotational speed by a maximum value.

11. The method according to claim 7, further comprising the step of only utilizing the engine speed of the drive unit, prevailing during the release of the brake pedal, as the starting rotational speed when the automatic transmission is in either a lowest possible forward gear or a lowest possible reverse gear.

* * * * *